(12) United States Patent
Akita et al.

(10) Patent No.: US 12,334,841 B2
(45) Date of Patent: Jun. 17, 2025

(54) CONTROL APPARATUS, POWER SUPPLY APPARATUS, PROCESSING APPARATUS, AND METHOD

(71) Applicant: KABUSHIKI KAISHA TOSHIBA, Tokyo (JP)

(72) Inventors: Koji Akita, Kanagawa (JP); Yukako Tsutsumi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 323 days.

(21) Appl. No.: 17/901,560

(22) Filed: Sep. 1, 2022

(65) Prior Publication Data

US 2023/0198425 A1 Jun. 22, 2023

(30) Foreign Application Priority Data

Dec. 17, 2021 (JP) ................. 2021-205259

(51) Int. Cl.
*H02M 7/5395* (2006.01)
*H02M 1/08* (2006.01)
*H02P 27/08* (2006.01)

(52) U.S. Cl.
CPC ........... *H02M 7/5395* (2013.01); *H02M 1/08* (2013.01); *H02P 27/08* (2013.01)

(58) Field of Classification Search
CPC .... H02M 7/5395; H02M 1/08; H02M 1/0012; H02M 1/44; H02M 7/53873; H02M 1/088; H02M 7/5387; H02P 27/08; H02P 29/024
See application file for complete search history.

(56) References Cited

U.S. PATENT DOCUMENTS

| 2007/0207734 A1* | 9/2007 | Briere | H04B 7/10 |
| | | | 340/13.25 |
| 2012/0188833 A1* | 7/2012 | Yamahara | G11C 29/022 |
| | | | 365/193 |

(Continued)

FOREIGN PATENT DOCUMENTS

| JP | H11178349 A | 7/1999 |
| JP | 2005051959 A | 2/2005 |
| JP | 2005261104 A | 9/2005 |

(Continued)

OTHER PUBLICATIONS

Japanese Office Action (and an English language translation thereof) dated Jan. 7, 2025, issued in counterpart Japanese Application No. 2021-205259.

*Primary Examiner* — Metasebia T Retebo
(74) *Attorney, Agent, or Firm* — Holtz, Holtz & Volek PC

(57) ABSTRACT

According to one embodiment, a control apparatus includes a gate signal generation circuit, a transmitter, a receiver, and an error processing circuit. The gate signal generation circuit is configured to generate a gate signal to switch a state of a gate circuit. The transmitter is configured to transmit the generated gate signal. The receiver is configured to receive the transmitted gate signal. The error processing circuit is configured to process an error in the received gate signal and to output the gate signal to the gate circuit. A process delay by the error processing circuit is greater than a sampling period of the gate signal switching the state of the gate circuit and is equal to or less than a time to retain the state of the gate circuit.

14 Claims, 12 Drawing Sheets

(56) References Cited

U.S. PATENT DOCUMENTS

2015/0180382 A1 6/2015 Hamada et al.
2019/0341851 A1 11/2019 Yuzurihara et al.

FOREIGN PATENT DOCUMENTS

| JP | 2011010117 A | 1/2011 |
| JP | 2011160570 A | 8/2011 |
| JP | 2012060793 A | 3/2012 |
| JP | 2012150769 A | 8/2012 |
| JP | 2013128375 A | 6/2013 |
| JP | 2014212616 A | 11/2014 |
| JP | 2018107886 A | 7/2018 |
| JP | 2018207686 A | 12/2018 |

* cited by examiner

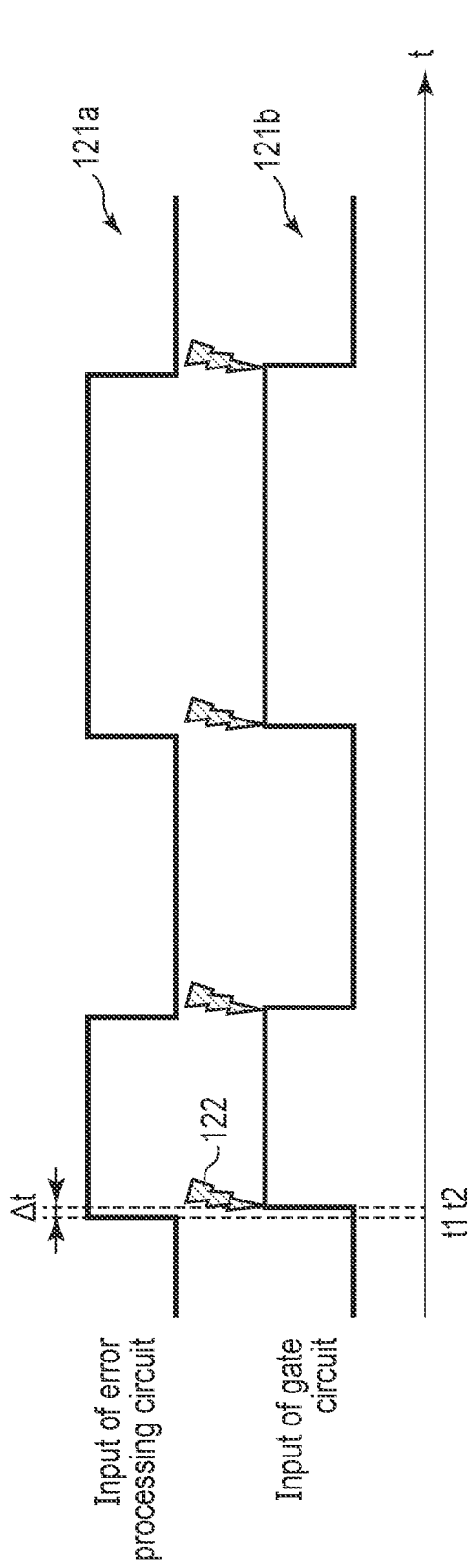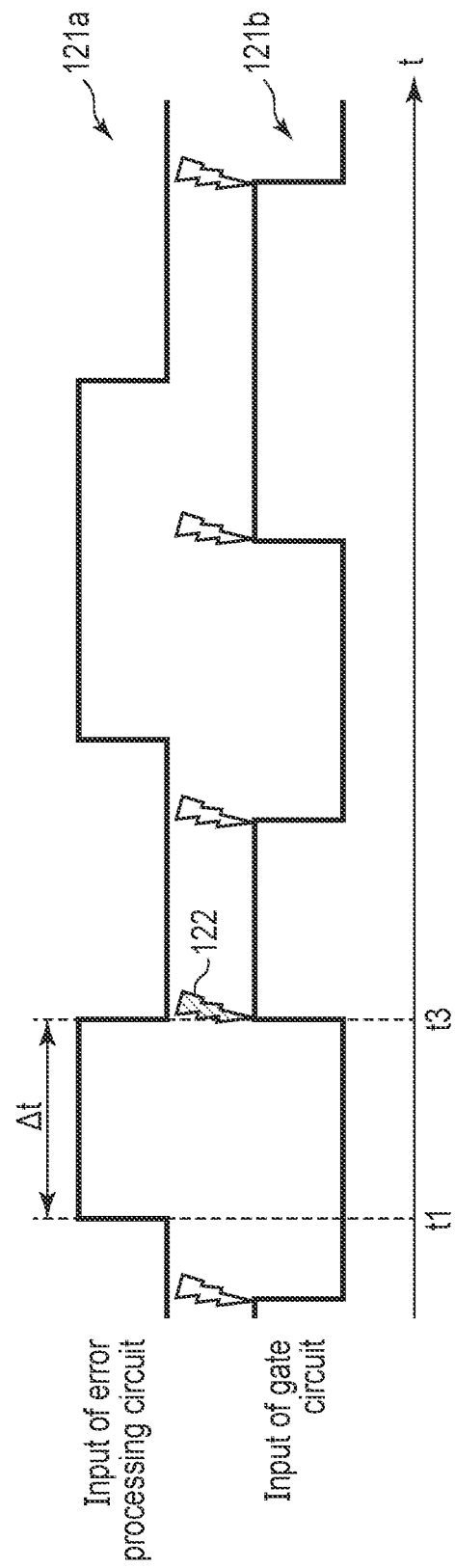

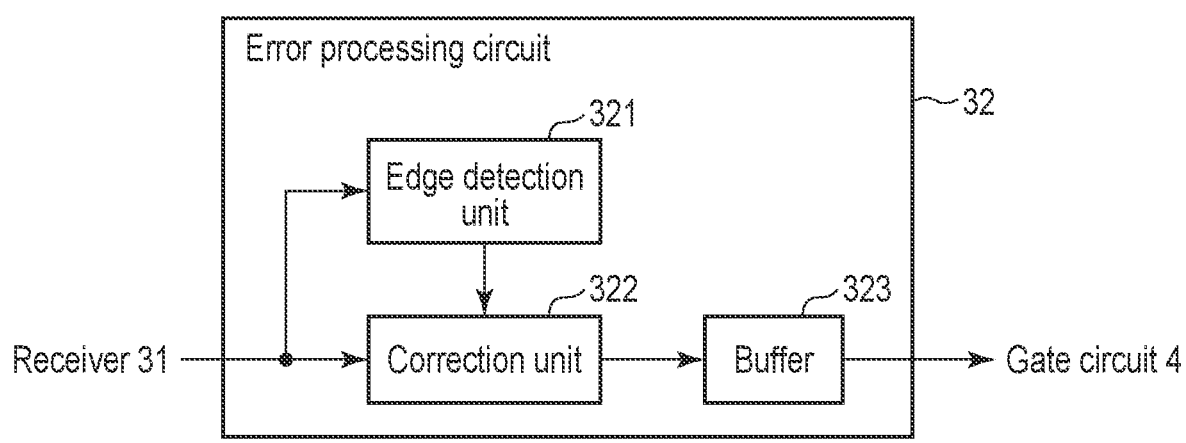
F I G. 11

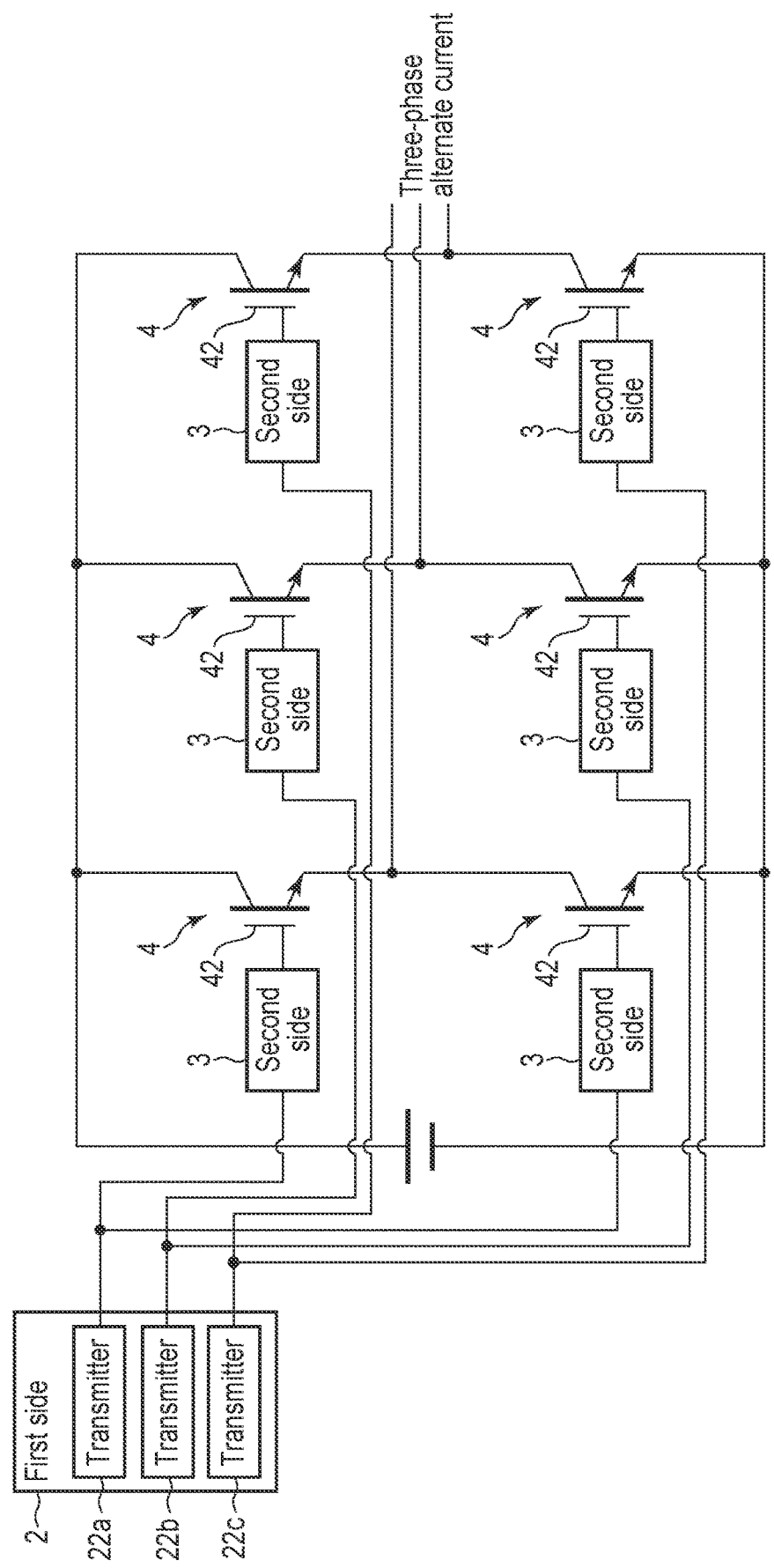
F I G. 13

CONTROL APPARATUS, POWER SUPPLY APPARATUS, PROCESSING APPARATUS, AND METHOD

CROSS-REFERENCE TO RELATED APPLICATIONS

This application is based upon and claims the benefit of priority from Japanese Patent Application No. 2021-205259, filed Dec. 17, 2021, the entire contents of which are incorporated herein by reference.

FIELD

Embodiments described herein relate generally to a control apparatus, power supply apparatus, processing apparatus, and method.

BACKGROUND

Power supply apparatuses configured to generate required output power from input power (for example, inverters) include a gate circuit (gate switch), and when on/off state of the gate circuit in the power supply apparatuses is switched, a voltage of the power source, conversion from direct current (DC) to alternate current (AC), and AC frequency can be controlled, for example.

Note that, a gate signal used to switch the on/off state of the gate circuit (that is, used to control the gate circuit) is a pulse signal representing the on/off state of the gate circuit. Based on a pulse width of the gate signal, a period in which the gate circuit is in on state, a period in which the gate circuit is in off state, and switching between on/off states can be designated.

In this example, in a time when the on/off state of the gate circuit is switched (hereinafter referred to as edge timing), the voltage applied to the gate circuit steeply increases or decreases, and noise is produced from the gate circuit. The noise form the gate circuit affects the gate signal later input to the gate circuit (that is, gate signal being transmitted to the gate circuit), resulting a possible error in the gate signal. Errors in the gate signal can be corrected; however, in a case where proper correction of the errors is difficult to perform, accuracy of the gate signal is lowered.

That is, a mechanism to improve the accuracy of the gate signal to be input to the gate circuit is demanded.

BRIEF DESCRIPTION OF THE DRAWINGS

FIG. 6 illustrates a temporal relationship between a gate signal input to an error processing circuit and a gate signal input to a gate circuit.

FIG. 7 illustrates another example of the temporal relationship between the input of the error processing circuit and the input of the gate circuit.

FIG. 11 illustrates another example of the structure of the error processing circuit.

FIG. 13 illustrates an example of implementation of the control apparatus of the embodiment.

FIG. 1A illustrates an example of implementation of the control apparatus of the embodiment.

DETAILED DESCRIPTION

In general, according to one embodiment, a control apparatus is configured to control a gate circuit. The control apparatus includes a gate signal generation circuit, a transmitter, a receiver, and an error processing circuit. The gate signal generation circuit is configured to generate a gate signal to switch a state of the gate circuit. The transmitter is configured to transmit the generated gate signal. The receiver is configured to receive the transmitted gate signal. The error processing circuit is configured to process an error in the received gate signal and to output the gate signal to the gate circuit. A process delay by the error processing circuit is greater than a sampling period of the gate signal switching the state of the gate circuit and is equal to or less than a time to retain the state of the gate circuit.

Various embodiments will be described with reference to the accompanying drawings.

Figure 1:
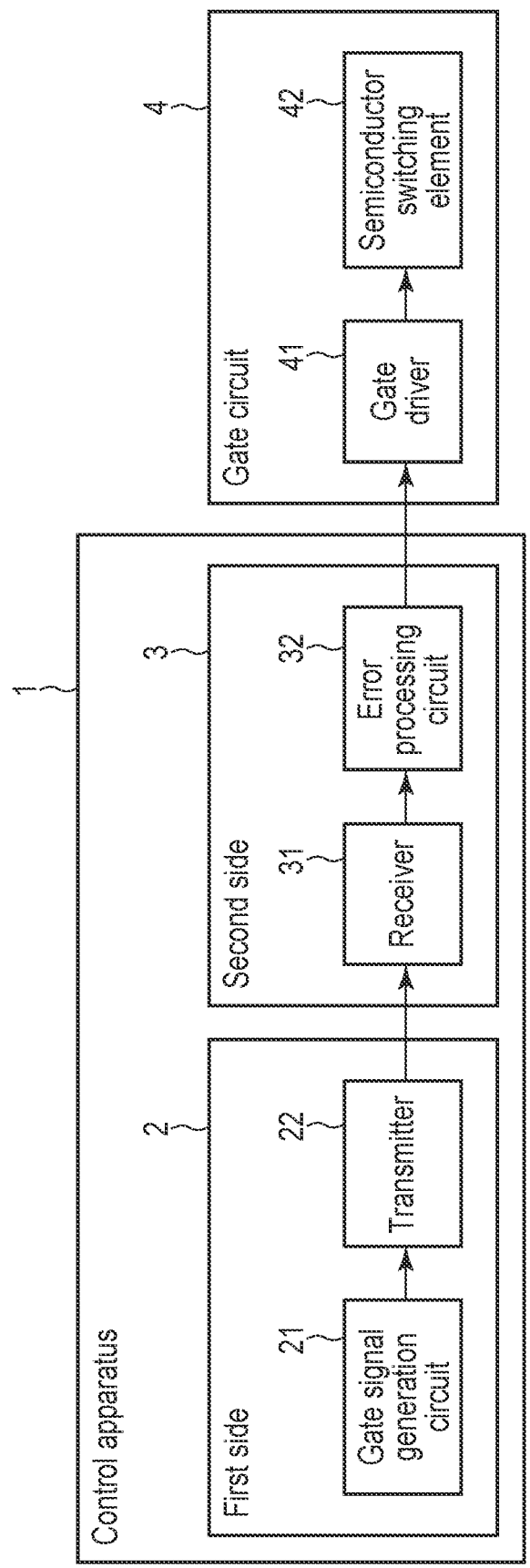
FIG. 1 is a block diagram illustrating an example of the structure of a control apparatus of an embodiment.

FIG. 1 is a block diagram shewing an example of the structure of a control apparatus of an embodiment. The control apparatus of the present embodiment controls a gate circuit described below. The control apparatus is applied to a power supply apparatus which generates the required output power from input power, such as an inverter.

As in FIG. 1, the control apparatus 1 includes a first side 2 and a second side 3 connected to the first side 2.

The first side 2 includes a gate signal generation circuit 21 and a transmitter 22. The gate signal generation circuit 21 is a circuit configured to generate gate signals to control the gate circuit. The transmitter 22 transmits the gate signal generated by the gate signal generation circuit 21 to the second side 3.

The second side 3 includes a receiver 31 and an error processing circuit 32. The receiver 31 receives the gate signals transmitted from the first side 2 (transmitter 22). The error processing circuit 32 processes an error in the gate signal received by the receiver 31 and outputs the gate signal to gate circuit 4. Note that, the error processing circuit 32 mainly performs error correction with respect to the gate signal (that is, it performs the process of correcting errors in the gate signal). The output of error processing circuit 32 corresponds to the input to the gate circuit 4.

The gate circuit 4, which is controlled by the control apparatus 1 described above, is a circuit to turn the gate ON or OFF according to the gate signal output from error processing circuit 32 (that is, switching ON/OFF state of the gate circuit 10). Specifically, the gate circuit 4 includes a gate driver 41 and a semiconductor switching element 42, and the gate signal output from the error processing circuit 32 is input to the gate driver 41, and the gate driver 41 drives the semiconductor switching element 42. Through turning on/off of the semiconductor switching element 42, the gate circuit 4 contributes to the generation of the required output power (output voltage). In the present embodiment, for convenience, the gate circuit 4 is turned on or off (that is, on/off state of the gate circuit 4), and not that, on/off of the gate circuit 4 corresponds to on/off of the semiconductor switching element 42 described above.

Figure 2:
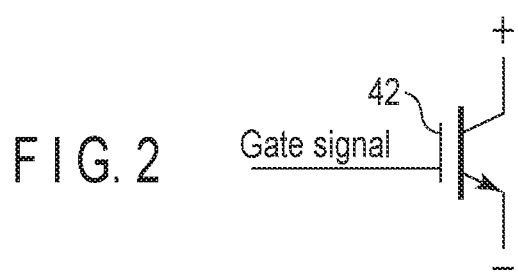
FIG. 2 is a schematic view of a gate circuit.

FIG. 2 schematically illustrates the semiconductor switching element 42 included in the gate circuit 4. As in FIG. 2, the semiconductor switching element 42 is configured to be held by circuits where a voltage is applied, and by switching the on/off state thereof based on the gate signal, the function as a switch is realized.

In FIG. 1, the control apparatus 1 is includes a first side 2 and a second side 3. The control apparatus 1 of the present embodiment may be realized as a control system with a control apparatus and a processing apparatus in which the first side 2 is structured as an independent apparatus (the control apparatus) and the second side 3 is structured as an independent apparatus (the processing apparatus). Furthermore, the control apparatus 1 may include a gate circuit 4 to be realized as a power supply apparatus.

Now, an outline of the error correction with respect to gate signals performed by the error processing circuit 32 will be explained.

Figure 3:
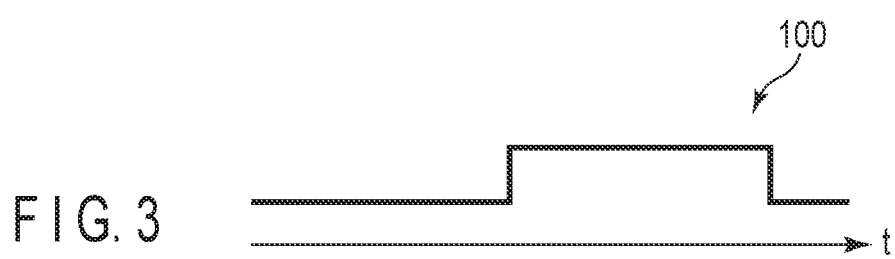
FIG. 3 illustrates an outline of error correction with respect to a gate signal.

First, FIG. 3 illustrates the gate signal 100 (pulse waveform thereof) with no error. Although not shown in the figure, the vertical axis of FIG. 3 represents a voltage value applied to the gate circuit (input unit thereof), and the horizontal axis represents time. The same applies to the other figures.

When the gate signal 100 as in FIG. 3 is input to the gate circuit 4, the on/off state of the gate circuit 4 can be appropriately switched according to the pulse width of the gate signal 100.

Figure 4:
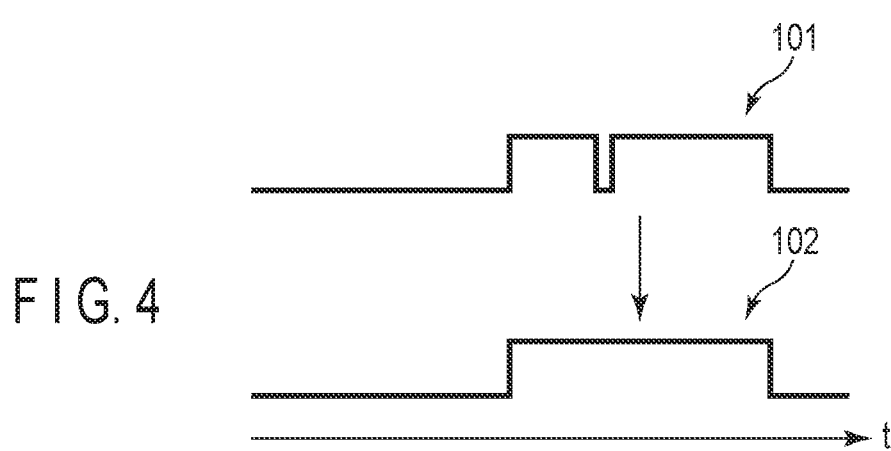
FIG. 4 illustrates the outline of error correction with respect to the gate signal.

On the other hand, the upper part of FIG. 4 illustrates a gate signal 101 with an error. When the gate signal 101 of FIG. 4 is received by the receiver 31, the error processing circuit 32 performs the error correction with respect to the gate signal 101. In that case, the error processing circuit 32 can correct the error by, for example, retaining the value of the gate signal with no error (that is, the value of the gate signal at a timing prior to when the error occurred). According to the above, a gate signal 102 shown in the lower part of FIG. 4 (the gate signal similar to the error-free gate signal 100) can be input to the gate circuit 4.

A timing at which the on/off state of the gate circuit 4 is switch based on the gate signal (that is, a rising edge or a falling edge of the gate signal) will be referred to as edge timing, and it is understood that an error occurs in the gate signal 101 in the upper part of FIG. 4 above in a position (timing) other than the vicinity of the edge timing. With such a gate signal 101, it is relatively easy to correct the error.

Figure 5:
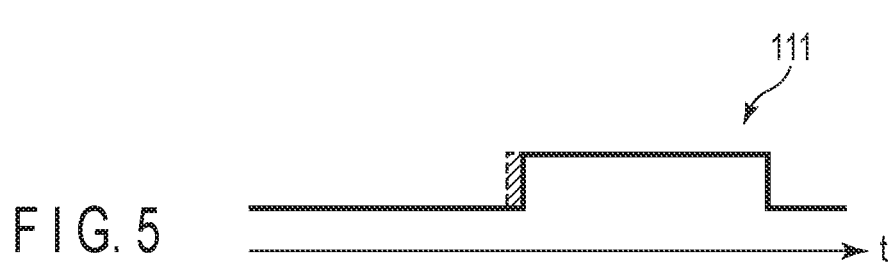
FIG. 5 illustrates the outline of error correction with respect to the gate signal.

In contrast, for example, a case where an initial value in the transition from off to on is an error as in a gate signal 111 of FIG. 5 (that, is, the error occurs in a position near the edge timing) will be considered. If the error correction described above is performed on the gate signal 111, even if the value of gate signal 111 (the value corresponding to the OFF state) is retained, the error (that is, the value that should have been on) cannot be corrected.

That is, when an error is corrected by retaining the value of the gate signal, with no error as described above, the error can be corrected correctly if the value of the gate signal at the timing before the error occurred is the same as the correct value of the gate signal at the timing when the error occurred. However, if the value of the gate signal at the timing before the timing when the error occurred is different from the correct gate signal value at the timing when the error occurred, the error cannot be corrected correctly. Thus, if the error occurs in the vicinity of the edge timing, the accuracy of the gate signal may be deteriorated.

By the way, when a gate signal is input to the gate circuit 4 in the present embodiment, the voltage applied to the gate circuit 4 steeply rises or falls at the edge timing of the gate signal described above, and noise is generated from the gate circuit 4. Such noise affects the gate signals which are subsequently input to the gate circuit (e.g., gate signals transmitted from the transmitter 22 to the receiver 31), causing errors in the gate signals (hereinafter referred to as burst error).

Here, FIG. 6 illustrates an example of a temporal relationship between the gate signal input to the error processing circuit 32 (input of the error, processing circuit 32) and the gate signal input to the gate circuit 4 (input of the gate circuit 4). Note that, the input of the error processing circuit 32 in the present embodiment is equivalent to the output of the receiver 31.

For example, if the gate signal input to the error processing circuit 32 is input to the gate circuit 4 without delay, the input of the error processing circuit 32 and the input of the gate circuit 4 should be almost the same. However, in reality, the timing of the gate signal input to the error processing circuit 32 and the timing of the gate signal input to the gate circuit 4 are temporally shifted based on the processing of error in the gate signal by the error processing circuit 32 (hereinafter referred to as process delay by the error processing circuit 32).

Specifically, in the example of FIG. 6, the edge timing of a gate signal 121a input to the error processing circuit 32 is timing t1 while the edge timing of a gate signal 121b input to the gate circuit 4 is timing t2 which corresponds to a time when a process delay $\Delta t$ has elapsed from timing t1.

When such gate signal 121b is input to the gate circuit 4, the gate circuit 4 is switched to on from off at the timing t2 (edge timing) (that is, the voltage applied to the gate circuit 4 steeply rises), and noise 122 generated based on the steep rise of the voltage highly likely affects the gate signal 121a input to the error processing circuit 32 (that is, causes burst error in the gate signal 121a).

In that case, given that the process delay $\Delta t$ of FIG. 6 is very small, the noise 122 generated at the timing t2 will cause the burst error in the position near the timing t1 of the gate signal 121a input to the error processing circuit 32 (that is, near the edge timing). As mentioned above, it is difficult to correctly correct a burst error near the edge timing.

In FIG. 6, the case where the process delay $\Delta t$ is very small has been described. FIG. 7 illustrates a temporal relationship between the gate signal input to the error processing circuit 32 and the gate signal input to the gate circuit 4 when the process delay $\Delta t$ is large.

The example of FIG. 7 does not cause a burst error in the vicinity of timing t1 (edge timing) of gate signal 121a as in FIG. 6; however, it causes a burst error in the vicinity of timing t3 of the gate signal 121a at which the voltage applied to the gate circuit 4 falls steeply (that is, a next edge timing after the edge timing). It is difficult to correctly correct such a burst error.

That is, in the structure where the on/off state of the gate circuit 4 is switched, a sudden change (rise and fall) in the voltage applied to the gate circuit 4 is inevitable. However, according to the examples of FIGS. 6 and 7, even if the process delay Δt is very small or large, burst errors may occur in the vicinity of the edge timing of the gate signal 121a, and it may be difficult to correctly correct such burst errors.

Therefore, in the present embodiment, the process delay (time) is controlled by the error processing circuit 32 such that the timing of a sudden change in the voltage applied to gate circuit 4 (that is, the timing at which a burst error occurs) avoids the edge timing of gate signal input to the error processing circuit 32.

Specifically, the above gate signals are generated according to a predetermined sampling cycle set according to the control apparatus 1 (gate circuit 4). The sampling cycle is the minimum unit which can switch the on/off state of the gate circuit 4 according to the gate signal generated by the gate signal generation circuit 21 included in the first side 2 (that is, minimum unit of gate signal for controlling the gate circuit 4), and the pulse width of the gate signal is a time equivalent to an integer multiple of the sampling period.

Note that gate circuit 4 has a time to retain (hold) the state (on or off state) of the gate circuit 4 depending on characteristics thereof and other factors. The sampling cycle is the minimum unit which can switch the state of gate circuit 4, but the state of gate circuit 4 cannot be switched before the time to retain the state of gate circuit 4 has elapsed. In other words, the state of the gate circuit 4 cannot be switched before the time to retain the state of gate circuit. 4 has elapsed. Hereafter, the time to retain the state of gate circuit 4 described above will be referred to as state duration time. The pulse width of the gate signal is larger than the state duration time.

In the present embodiment, the process delay by the error processing circuit 32 is controlled in consideration of the aforementioned sampling period and state duration time. Specifically, the process delay by the error processing circuit 32 is set to be larger than the sampling cycle and to be equal to or less than the state duration time, as in FIG. 8.

According to the above, by setting the process delay Δt larger than the sampling period, it is possible to avoid burst errors in the vicinity of timing t1 (edge timing) of the gate signal 121a input in the error processing circuit 32, explained above with reference to FIG. 6. Furthermore, by setting the process delay Δt equal to or less than the state duration time, it is possible to avoid burst errors in the vicinity of timing t3 (edge timing) of the gate signal 121b input to the error processing circuit 32, explained above with reference to FIG. 7.

In that case, the noise 122 caused by the sudden rise in the voltage applied to the gate circuit 4 occurs at timing t4 between timing t1 and timing t3, and thus, the burst error caused by the noise 122 can be generated at a position not near the edge timing of the gate signal 121a. Thus, errors generated at timing t4 can be corrected more easily than burst errors generated in the vicinity of the edge timing.

The time in which the gate circuit 4 stays in the on state (hereinafter referred to as on state duration time) and the time in which the gate circuit 4 stays in the off state (hereinafter referred to as off state duration time) may be the same or different. The aforementioned state duration time may be one of the on state duration time and the off state duration time. Specifically, when the on state duration time and the off state duration time are the same, the on state duration time (or off state duration time) should be used as the state duration time. On the other hand, if the on state duration time and the off state duration time are different, the smaller of the on state duration time and off state duration time should be used as the state duration time. Generally, the off state duration time is longer than the on state duration time, and in that case, the on state duration time is used as the state duration time.

Figure 8:
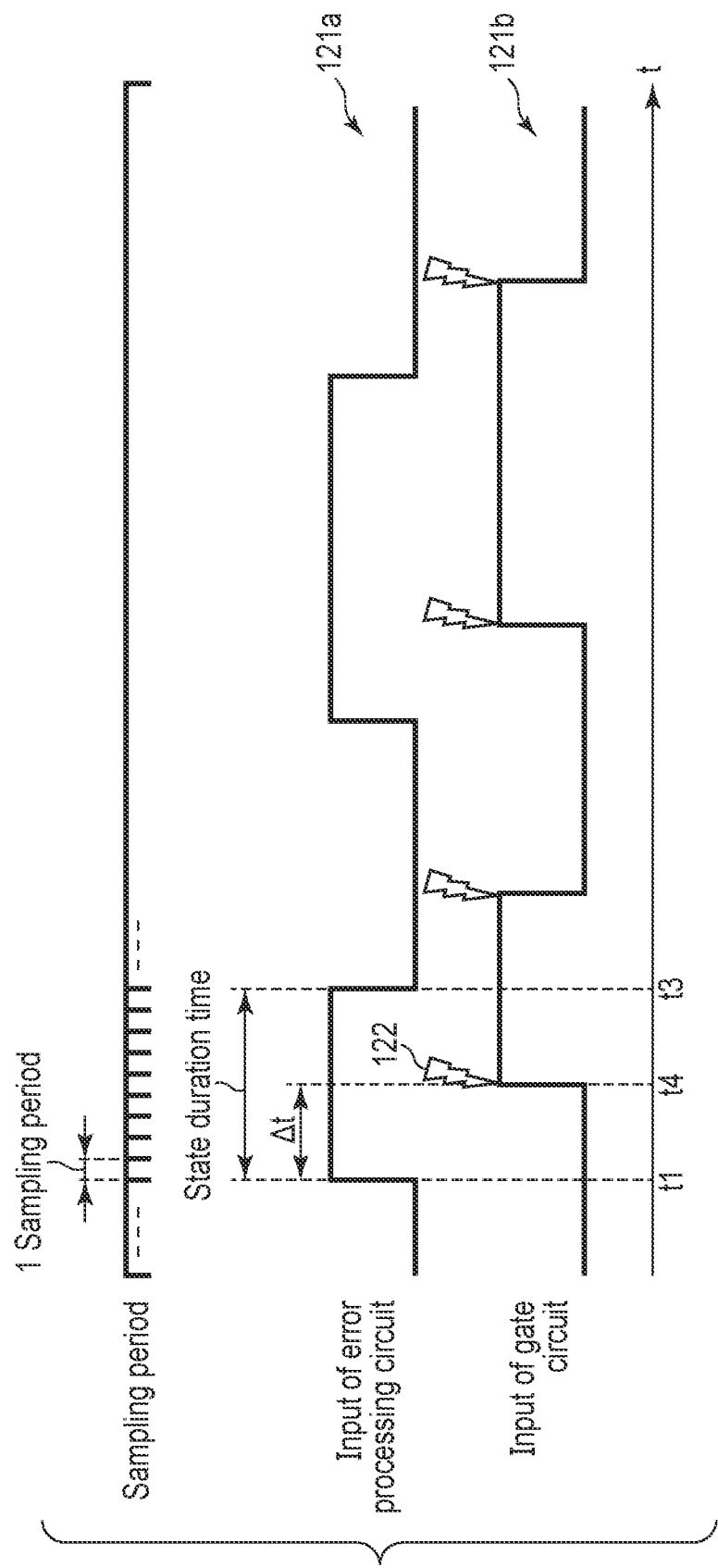
FIG. 8 illustrates process delay by the error processing circuit of the embodiment.

Furthermore, FIGS. 6 to 8 above illustrate the temporal relationships between the gate signal input to the error processing circuit 32 and the gate signal input to the gate circuit 4; however, the gate signal input to the error processing circuit 32 (that is, the gate signal affected by noise generated by the gate circuit 4) is intended to be the gate signal up to the point where it is input to the error processing circuit 32, and includes, for example, gate signals output from the receiver 31 and gate signals during transmission from the transmitter 22 included in the first side 2 to the receiver 31 included in the second side 3.

As described above, in the present embodiment, the first side 2 (control apparatus) generates the gate signal to switch the on/off state of the gate circuit 4, and transmits the generated gate signal to the second side 3. The second side 3 (processing apparatus) receives the gate signal transmitted from the first side 2, processes errors in the received gate signal, and outputs the gate signal to the gate circuit 4. In that case, the process delay by the error processing circuit 32 in the present embodiment is larger than the sampling period, which is the smallest unit of gate signal to control the gate circuit 4, and the process delay is less than or equal to the state duration time for which the gate circuit retains the on or off state. In the present embodiment, with the above structure, noise can be generated from the gate circuit 4 at a timing that allows relatively easy error correction, thus enabling improvement of the accuracy of the gate signal input, to the gate circuit 4 (that is, subsequent gate signals).

The present embodiment is not structured to avoid the occurrence of burst errors, but structured to assume that burst errors will occur and thus realize easy correction of such burst errors. For this reason, the present embodiment is more useful when applied to environments where burst errors occur relatively easily.

Specifically, for example, when the first side 2 and the second side 3 are configured on different boards, gate signals must be transmitted/received between the first side 2 and the second side 3 (in other words, transmitted between boards). Therefore, as compared to a case where the gate signals are transmitted on the same substrate, the gate signals are more susceptible to noise generated by the gate circuit 4. Therefore, the present embodiment may be applied to a structure where the first side 2 and the second side 3 are mounted on different boards.

Furthermore, if the transmission/reception of the gate signals between the first side 2 (transmitter 22) and the second side 3 (receiver 31) is performed at a shorter period than the sampling period (for example, gate signals of multiple sampling periods are bundled and transmitted), the gate signals are easily affected by noise generated from the gate circuit 4. Therefore, the present embodiment may be applied to such a structure where the transmission/reception of gate signals between the first side 2 and the second side 3 is performed at a shorter period than the sampling period described above (that is, high-speed communication is performed).

Furthermore, when the first side 2 (transmitter 22) and the second side 3 (receiver 31) perform wireless communication (radio transmission), the signal power is more susceptible to attenuation than when wired communication is performed. Therefore, the gate signal is susceptible to noise generated by the gate circuit 4. Therefore, the present embodiment may be applied to a structure in which the first side 2 (transmitter 22) transmits gate signals wirelessly and the second side 3 (receiver 31) receives the gate signals transmitted wirelessly.

In other words, the present embodiment is more effective when, for example, advanced communication is performed between the first side 2 and the second side 3, where the accuracy of the gate signal is prone to degradation.

By the way, in the present embodiment, burst errors in the gate signal are processed (corrected) by error processing circuit 32. The error processing circuit 32 will be further explained.

In the present embodiment, the error processing circuit 32 should be configured in a range from the output of receiver 31 to the input of gate circuit 4. The output of receiver 31 corresponds, for example, to a stage where the value corresponding to the on or off state of the gate signal is determined by the receiver 31. The input of gate circuit 4 corresponds, for example, to the input unit where the gate signal shown in FIG. 2 is input.

According to the structure of the control apparatus 1 of the present embodiment, for example, during transmission of gate signals from the first side 2 (transmitter 22 included in the first side 2) to the second side 3 (receiver 31 included in the second side 3), gate signals are easily affected by the noise generated from the gate circuit 4 described above. However, even in the vicinity of the error processing circuit 32, the gate signal is affected by the noise (that is, the noise may cause burst errors in the gate signals). Therefore, the error processing circuit 32 (second side 3) should be structured to be less susceptible to noise generated from the gate circuit 4.

Specifically, for example, if the transmitter 22 and the receiver 31 are mounted on different substrates, the error processing circuit 32 is mounted on the same substrate as the receiver 31. Furthermore, the error processing circuit 32 may be configured such that the process period of the error processing circuit 32 is longer than the process period (signal period) to process (transmit/receive) gate signals between the transmitter 22 and the receiver 31, for example. Furthermore, if the transmitter 22 and the receiver 31 are connected wirelessly (that is, transmitter 22 and receiver 31 are configured to perform wireless communication), the receiver 31, error processing circuit 32, and gate circuit 4 may be wired together.

According to the above structure, it is possible to suppress a significant deterioration in gate signal quality in the vicinity of the error processing circuit 32 (that is, to reduce the occurrence of errors in gate signals) and to input highly accurate gate signals to gate circuit 4.

Note that, the structure described here which is less susceptible to noise generated by the gate circuit 4 is an example, and the error processing circuit 32 should be located in a position which is less susceptible to noise generated by the gate circuit 4, or configured such that it does not execute processing at a higher speed than necessary, for example.

Figure 9:
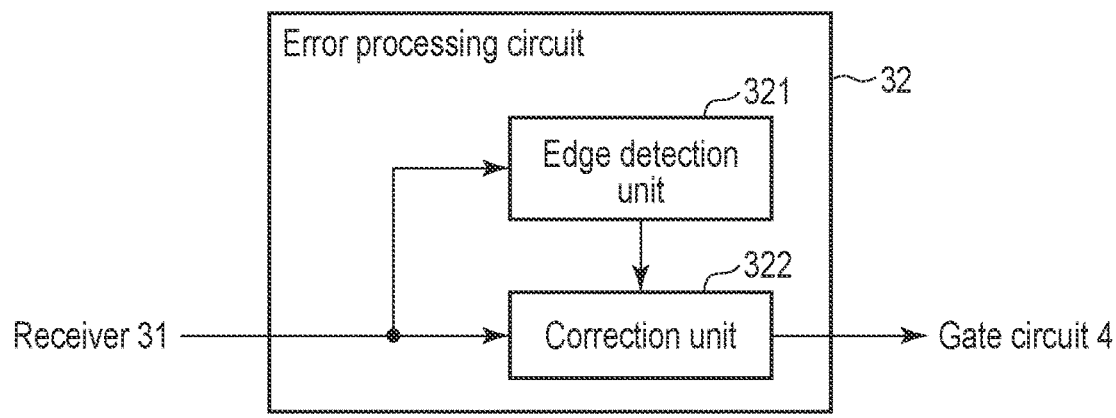
FIG. 9 illustrates an example of the structure of the error processing circuit.

Next, an example of the structure of the error processing circuit 32 will be described with reference to FIG. 9. As in FIG. 5, the error processing circuit 32 includes an edge detection unit (edge detection circuit) 321 and a correction unit (correction circuit) 322. The edge detection unit 321 may be implemented by at least one circuit. The correction unit 322 may be implemented by at least one circuit.

The edge detection unit 321 is configured to detect the edge timing of the gate signal input to the error processing circuit 32 (that is, rising or falling timing of the gate signal).

For example, it is difficult to detect correct edge timing when an error occurs in the vicinity of edge timing, but in the present embodiment, a burst error is generated at a position which is not in the vicinity of the edge timing (that is, burst error is avoided at a position in the vicinity of edge timing). Thus, the correct edge timing can be easily detected. Furthermore, in the present embodiment, a burst error occurs at a timing (position) which is distant from the edge timing by a time equivalent to the process delay, but this timing is far from the edge timing and the next edge timing of the edge timing, and thus, the edge timing can be detected by avoiding this timing. Therefore, the accuracy of edge timing detection can further be improved.

Here, the gate signal input to the error processing circuit 32 in the present embodiment is input to the gate circuit 4 after a time equivalent to the process delay described above has elapsed. In this case, noise is generated from the gate circuit 4 at the timing when the process delay has elapsed from the edge timing of the gate signal input to the error processing circuit 32, and the above Burst error is assumed to occur in the gate signal input to the error processing circuit 32.

The correction unit 322 is configured to correct the burst error which occurs in the gate signal after a time equivalent to the process delay by the error processing circuit 32 has elapsed from the edge timing detected by the edge detection unit 321 as described above (that is, to perform error correction with respect to the burst error).

Specifically, the correction unit 322 can correct the burst error by replacing the value of the gate signal in which the above-mentioned burst error has occurred with the value one sampling cycle before the value (that is, the value at the timing before the error occurred).

The value used by the correction unit 322 to correct the burst error may be the value may be the value of gate signals within a time period corresponding to the process delay by the error processing circuit 32 from the edge timing detected by the edge detection unit 321 (that is, gate signals input to the error processing circuit 32 during multiple sampling periods prior to the timing when the burst error occurs). If no error has occurred in the gate signal from the edge timing until a time equivalent to the process delay has elapsed, the value of the gate signal should be constant, and thus, the correction unit 322 uses the value to correct the burst error. Even if some of the gate signals from the edge timing to the time corresponding to the process delay have errors (that is, some of the gate signals contain different values), the burst error can be properly corrected by using the value determined by majority voting based on the gate signal values (that is, the gate signal values for each sampling cycle).

In the present embodiment, the correction unit 322 should be configured to be able to correct the gate signal value at the timing (time) when the aforementioned burst error is assumed to have occurred. For example, it may perform a correction process such as replacing the value of the gate signal with a correction value prepared in advance.

In the following description, the error correction performed by replacing the value of the gate signal with a burst error with a predetermined value as described above will be referred to as first error correction, for convenience. The correction unit 322 may be configured to perform correction using characteristics of the waveform (pulse waveform) of the gate signal (hereinafter referred to as second error correction). The second error correction will be explained below with reference to FIG. 10.

As described above, the gate signal changes its value with a period longer than the state duration time, but if the value changes in a shorter time than the state duration time, it can be estimated that an error has occurred.

Figure 10:
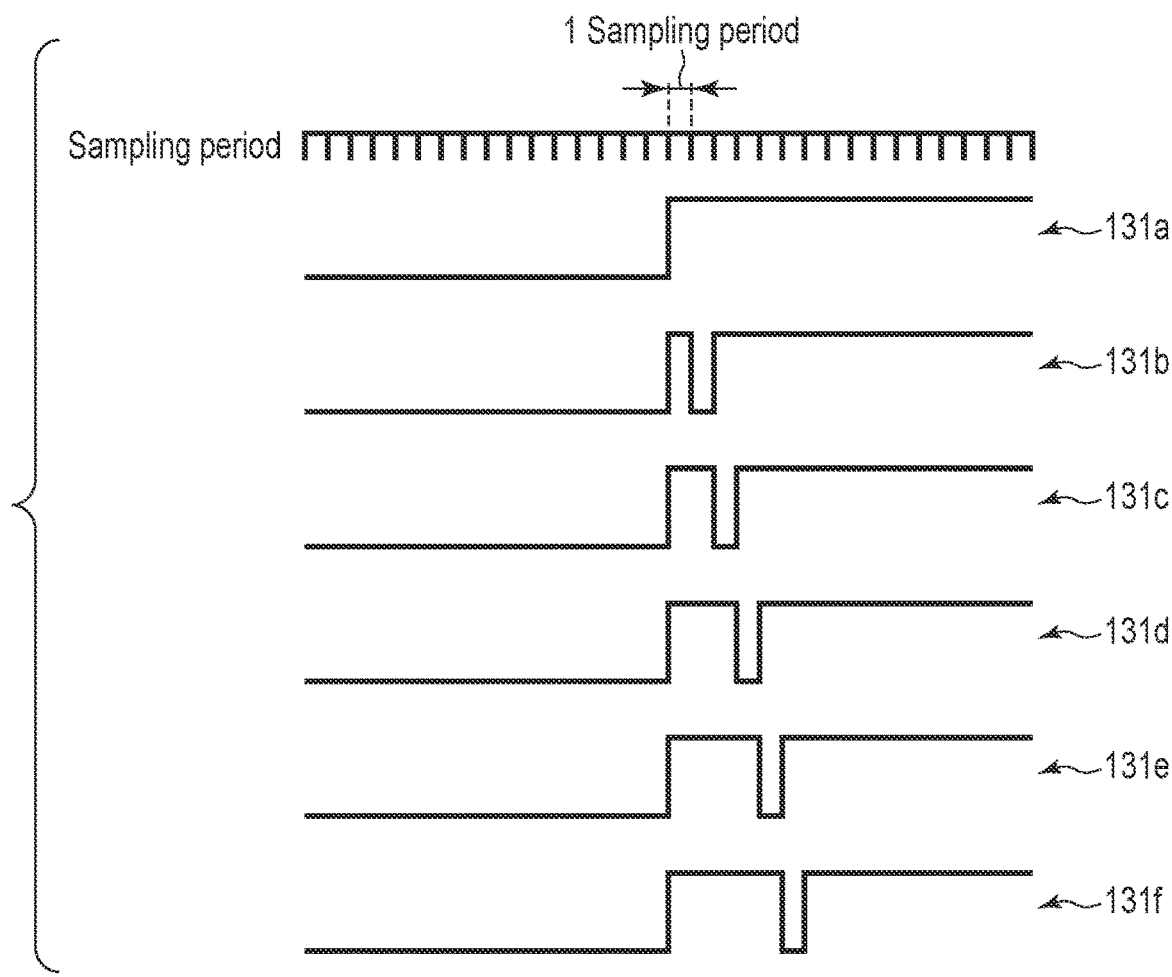
FIG. 10 illustrates second error correction.

Here, FIG. 10 shows the gate signal 131a with no errors, and the gate signals 131b to 131f with errors for one sampling period. Note that, in the gate signals 131b to 131f, errors occur at different timings.

Provided that an error does not occur for two or more consecutive sampling periods as in the gate signals 131b to 131f of FIG. 10, for example, the gate signals 131b to 131f can correct the errors by changing (replacing) the value corresponding to the off state for one sampling period with the value corresponding to the on state.

On the other hand, in the gate signal 131b, there are values corresponding to the on state and off state at positions near the edge timing of the gate signal 131b for one sampling period each, and thus, there is a possibility that the error cannot be corrected correctly.

However, in the present embodiment, the burst error is caused at a position which is not near the edge timing of the gate signal, and thus, even when the second error correction described above is performed, the burst error can be corrected appropriately.

Note that, the burst error must be detected to perform the first and second error correction described above, and the burst error may be detected using, for example, parity bits or by other methods.

Although the first and second error correction described above assume the case where the errors are corrected by digital signal processing; however, the correction unit 322 may be configured to perform error correction by analog signal processing (hereinafter referred to as third error correction). Specifically, the gate circuit 4 is switched between on and off states by the application of a predetermined voltage as a gate signal (that is, realizes a function as a switch), and a change in the voltage value for a time shorter than the above state duration time corresponds to a high-frequency component, which can be removed by passing the gate signal through a low-pass filter. As above, the errors in the gate signal, may be corrected analogously.

In the above, the first to third error corrections are described; however, the correction unit 322 may be configured to perform at least two of the first to third error corrections. Specifically, the correction unit 222 may, for example, perform the first error correction, and then at least one of the second and third error corrections.

The correction unit 322 may be configured to perform only one of the first to third error corrections. When the correction unit 322 does not perform the first error correction, the error processing circuit 22 may be configured without the edge detection unit 321 of FIG. 9.

Although the error correction for burst errors is mainly described here, the correction unit 322 may also correct errors which occur in the gate signals other than such burst errors. Furthermore, the error processing circuit 32 may be configured to include a correction unit which corrects errors in the gate signals other than burst, errors separately from the correction unit 322.

Note that the process delay by the error processing circuit 32 described above shall be controlled by the error processing circuit 32. In the present embodiment, the process delay by the error processing circuit 32 must be less than or equal to the state duration time, but in a case where the delay based on the error correction performed by the correction unit 322 exceeds the state duration time (larger than the state duration time), the delay is reduced by simplifying the error correction. On the other hand, in the present embodiment, the process delay by the error processing circuit 32 must be larger than the sampling period, but in a case where the error correction performed by the correction unit 322 is less than the sampling period (smaller than the sampling period), a buffer 323 is added inside the error processing circuit 32 as in FIG. 11 to generate an additional delay (that is, process delay is adjusted). Here, the structure in which the buffer 323 is provided inside the error processing circuit 32 has been described; however, it is possible, for example, to provide the buffer 323 separately between the error processing circuit 32 and the gate circuit 4, for example.

By the way, in the present embodiment, the process delay (lower limit thereof) by the error processing circuit 32 is described as being larger than the sampling period, but the process delay may be set to a value even longer than the sampling period. For example, if the process delay is set to a time equivalent to two or three sampling periods instead of one sampling period, a greater time difference between the timing at which noise is generated from the gate circuit 4 and the edge timing of the gate signal input to the error processing circuit 32, thus more reducing the effect of such noise.

If there is a possibility that errors (that is, errors other than burst errors) may occur in the gate signal due to effects other than noise generated by the gate circuit 4, a time period) which is twice or more than the time (period) in which the errors are expected to occur in succession may be set as the process delay. According to this, for example, when burst errors are corrected using the gate signal value within the time corresponding to the process delay by the error processing circuit 32 in the first error correction described above, it is possible to avoid a situation in which burst errors are not corrected properly using only the gate signal values corresponding to the errors other than burst errors (that is, the values used to correct burst errors are correctly determined by majority voting). Note that the time at which errors other than burst errors are assumed to occur continuously can be obtained in advance by analyzing (evaluating) the gate signal when the control apparatus 1 is actually operated.

Furthermore, in the present embodiment, the process delay (upper limit thereof) by the error processing circuit 32 is set to be less than or equal to the state duration time, but the process delay may be set to a predetermined time (hereinafter referred to as shortening time) subtracted (shortened) from the state duration time. When the time obtained by subtracting the shortening time from the state duration is set as the process delay (that is, process delay is shortened), it is possible to secure a greater time difference between the timing of noise generation from the gate circuit 4 and the edge timing of the gate signal input to the error processing circuit 32, thus resulting further reducing the possibility that burst errors caused by the noise will not be corrected properly.

Note that the noise (influence thereof; generated by the gate circuit 4 continues for a certain period of time, not for an instant, but with gradual decay. In other words, while the noise continues, the noise may affect the gate signal. In this case, the shortening time mentioned above may be, for example, the time during which the noise (switching noise) continues (that is, the time until the effect of the noise ends). According to the above, it is possible to avoid burst errors occurring in the vicinity of the subsequent edge timing due to the continuation of the noise.

From the viewpoint of avoiding burst errors in the vicinity of subsequent edge timing, the shortening time described above may be half of the state duration time. Furthermore, considering that the noise continues, the shortening time may be half the value of the state duration time plus the duration of the noise. In such a structure, for example, given that the pulse width of the gate signal is the state duration time, a time difference between the edge timing of the gate signal input to the error processing circuit 32 and the timing when noise is generated by the gate signal input to the gate circuit 4 and a time difference between the timing at which the effect of the noise ends and the edge timing following the edge timing can be adjusted such that they are at the same level. Thus, the possibility that burst errors caused by noise are not corrected properly can be further reduced.

In other words, the process delay of the present embodiment should be greater than the sampling period and less than or equal to the state duration time.

The following is a description of the use of the control apparatus 1 of the present embodiment. The control apparatus 1 of the present embodiment is incorporated in, for example, an inverter (power supply apparatus) which generates AC power (current) from DC power (current).

Figure 12:
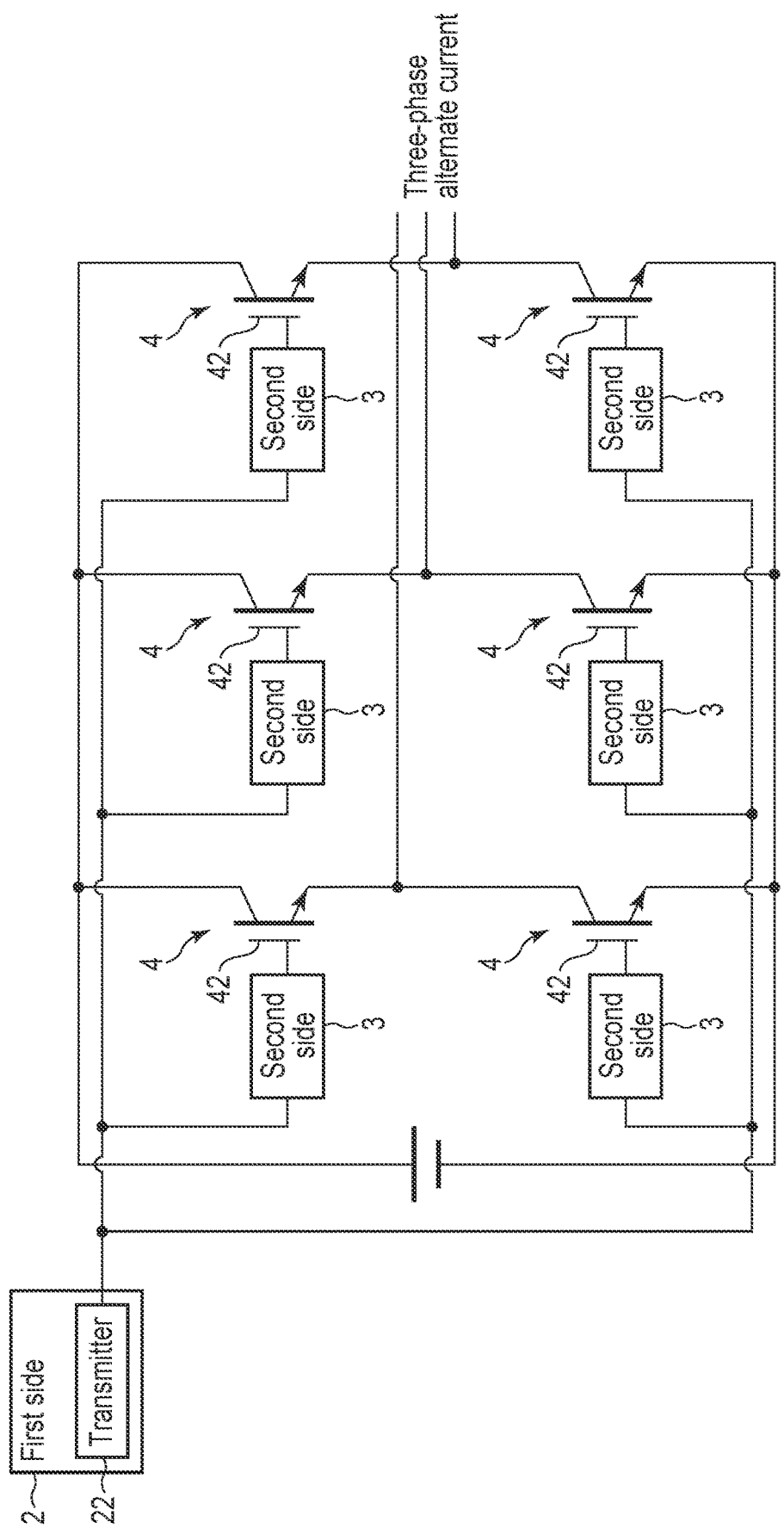
FIG. 12 illustrates an example of implementation of the control apparatus of the embodiment.

FIG. 12 illustrates an example of a three-phase inverter including six gate circuits 4 (semiconductor switching elements 42). In such a three-phase inverter, three-phase AC power can be generated from DC power by appropriately controlling each gate circuit 4. In the example of FIG. 12, two of the six gate circuits 4 arranged vertically form a pair, each outputting an AC power supply phase of which is shifted by 120 degrees. In the following explanation, the gate circuit 4 located in the upper side of each pair of gate circuits 4 will be referred to as upper arm and the gate circuit 4 located in the lower side as lower arm.

In FIG. 12, the gate signal generation circuit 21 included in the first side 2, the receiver 31 and the error processing circuit 32 included in the second side 3, and the gate driver 41 included in the gate circuit 4 are omitted for convenience.

In the example of FIG. 12, each of the six gate circuits 4 is connected to one transmitter 22 in the first side 2 through the second side 3. In such a structure, the transmitter 22 sends gate signals to control the six gate circuits 4 (that is, gate signals with respect to each of the six gate circuits 4) to the six second sides 3 collectively. Specifically, the gate signals transmitted by the transmitter 22 include the gate signal with respect to the first gate circuit 4, gate signal with respect to the second gate circuit 4, gate signal with respect to the third gate circuit 4, gate signal with respect to the fourth gate circuit 4, gate signal with respect to the fifth gate circuit 4, and gate signal with respect to the sixth gate circuit 4. Each of the second side 3 (receivers 31 included therein) selects a gate signal with respect to the gate circuit 4 connected to the second side 3 from the gate signals transmitted by the transmitter 22, and operates to transmit the selected gate signal to the gate circuit 4 at the same timing as the other second side 3. Note that, since the operation of second side 3 (receiver 31 and error processing circuit 32) has been described above, a detailed description is omitted here.

In FIG. 12, the case where six gate circuits 4 are connected to one transmitter 22 in the first side 2 has been described. However, the first side 2 may be configured to include three transmitters 22a to 22c as in FIG. 13. In such a structure, the transmitter 22a collectively sends gate signals to control a pair of the gate circuits 4 (upper and lower arms) to two second sides 3 each connected to the gate circuits 4, for example. Although the transmitter 22a is described here, other transmitters 22b and 22c should be operated in the same way to send gate signals to the two second side 3 each connected to the gate circuits 4.

Figure 14:
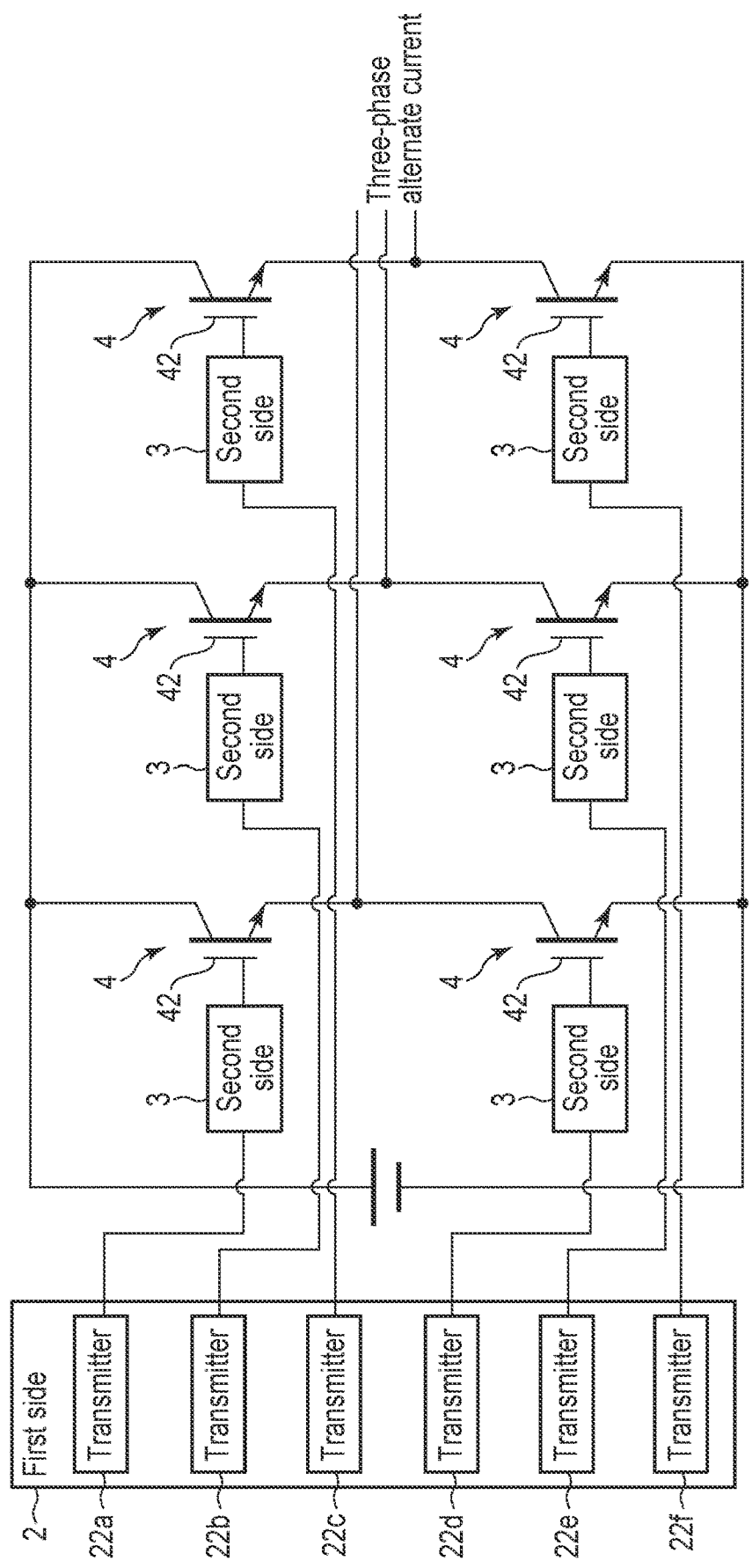

Furthermore, the first side 2 may be configured to include six transmitters 22a to 22f corresponding to six second sides 3 (gate circuits 4) as in FIG. 14, for example. In such a structure, the transmitters 22a to 22f may individually transmit gate signals to control the gate circuit 4 connected to the second side 3 corresponding to each of the transmitters 22a to 22f to the second side 3.

In FIGS. 12 to 14 above, it has been explained that the number of second sides 3 and gate circuits 4 are six each. However, the number of the second sides 3 (receivers 31 and error processing circuits 32) and gate circuits 4 may be as many as N (N is a natural integer greater than or equal to 2).

When the number of the second sides and the gate circuits 4 is N as described above, and when the first side 2 is configured to include a plurality of transmitters (for example, first and second transmitters) 22, the first transmitter 22 is configured to transmit first to Mth (M is a natural integer greater or equal to 1 but less than N) to first to Mth receivers 31 (second sides 3), and the second transmitter 22 is configured to transmit M+1th to Nth gate signals to M+1 to Nth receivers 31 (second sides 3).

Furthermore, when the number of second sides 3 and gate circuits 4 is N (for example, 2) as described above, and when the first side 2 is configured to include N transmitters (for example, first and second transmitters) 22, the first transmitter 22 is configured to transmit the first gate signal to the first transmitter 22 and the second transmitter 22 is configured to transmit the second gate signal to the second receiver 31.

Figure 15:
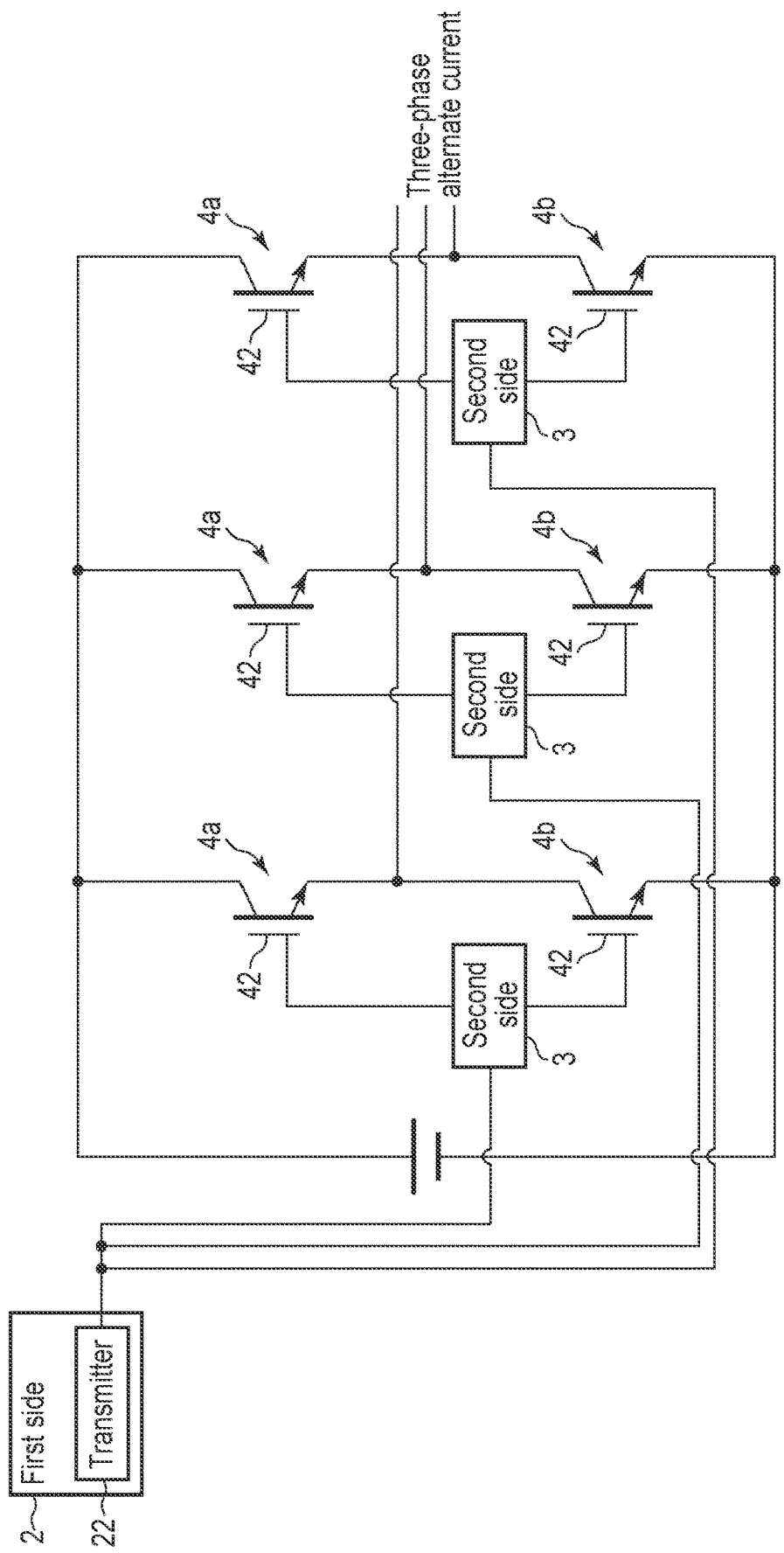
FIG. 15 illustrates an example of implementation of the control apparatus of the embodiment.

Note that, the above description has been given provided that each of the multiple second sides 3 is connected to one gate circuit 4 (that is, the second side 3 is divided between the upper and lower arms); however, the second sides 3 may be configured to be connected to one pair (that is, two) of gate circuits 4a and 4b as in FIG. 15 (that is, the second side 3 is not divided between the upper and lower arms). In such a structure, the gate signals transmitted to each of the second sides 3 by the transmitter 22 are input to each of the gate circuits 4a and 4b via the second side 3 (that is, they are sorted).

Figure 16:
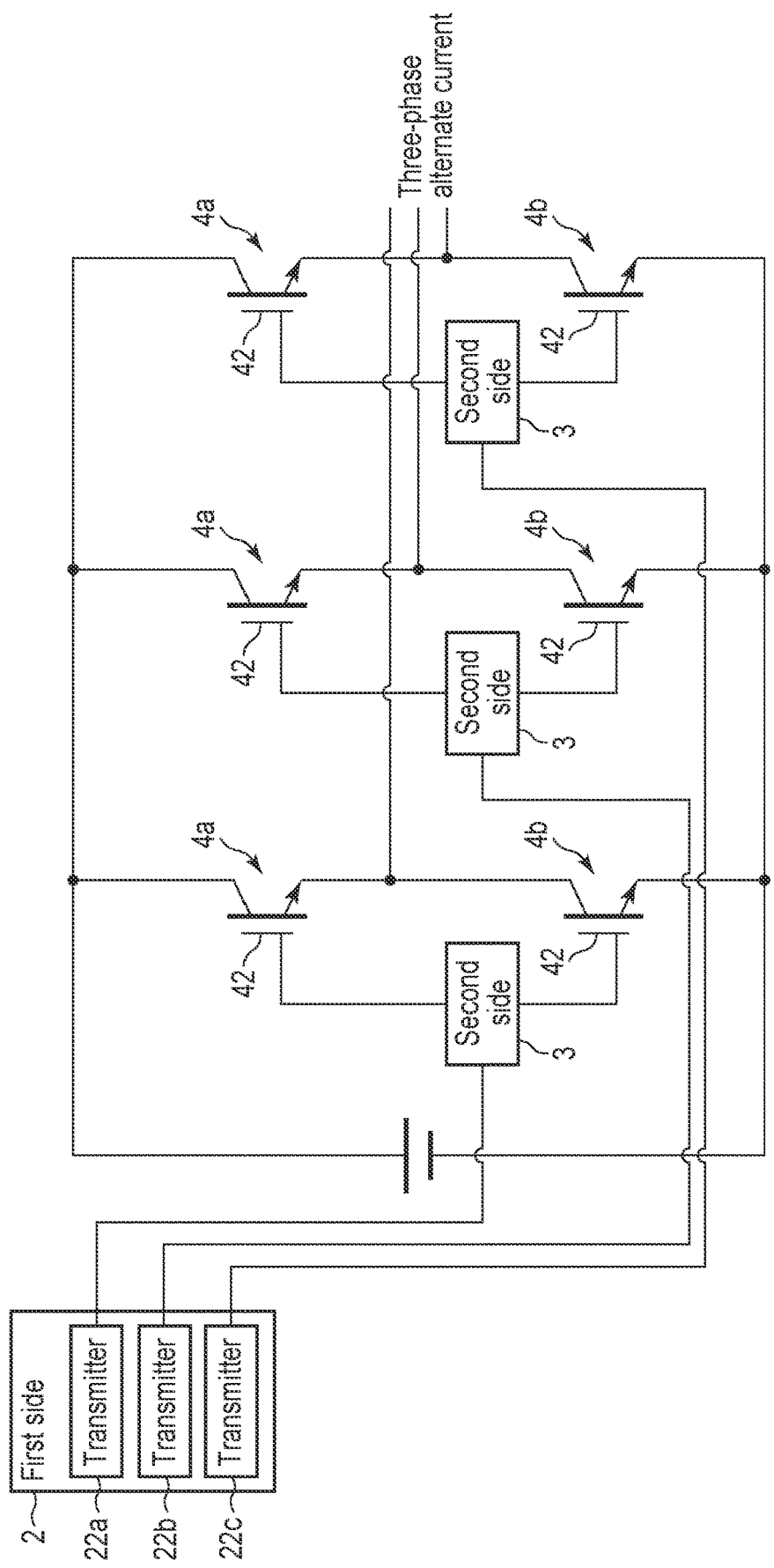
FIG. 16 illustrates an example of implementation of the control apparatus of the embodiment.

FIG. 15 illustrates a structure in which the first side 2 includes one transmitter 22 and the transmitter 22 transmits gate signals to three second sides 3 connected to a pair of gate circuits 4a and 4b, respectively. However, as shown in FIG. 16, the first side 2 may include three transmitters 22a to 22c, and the transmitters 22a to 22c individually transmit the gate signals to the corresponding second side 3. Note that, in FIGS. 15 and 16, the gate signal generation circuit 21 included in the first side 2, receiver 31 and error processing circuit 32 included in the second side 3, and gate driver 41 included in the gate circuit 4 are omitted for convenience.

By the way, according to the three-phase inverters (circuit diagram) shown in FIGS. 12 to 16 above, when the upper arm and lower arm (gate circuit) are turned on simultaneously, a short circuit occurs. Therefore, the gate signal to control the upper arm and the gate signal to control the lower arm are generated (adjusted) such that the upper arm and the lower arm do not turn on at the same time. Furthermore, if one of the upper and lower arms transitions from the off state to the on state immediately after the other transitions from the on state to the off state, the state may be close to a short circuit depending on the circuit characteristics. Therefore, it is recommended that a waiting period (fixed period) is provided between the transition of one from the on to off state and the transition of the other from the off to on state.

Such a waiting period will be referred to as dead time. In the case where the upper and lower arms are controlled as above (switching the on/off state of each of the upper and lower arms), it is necessary to control (set) process delay in consideration of the dead time in addition to the sampling period and state duration time described above. Specifically, the process delay by the error processing circuit 32 should be set to be larger than the sampling period, equal to or less than the state duration time, and equal to or less than the dead time.

Figure 17:
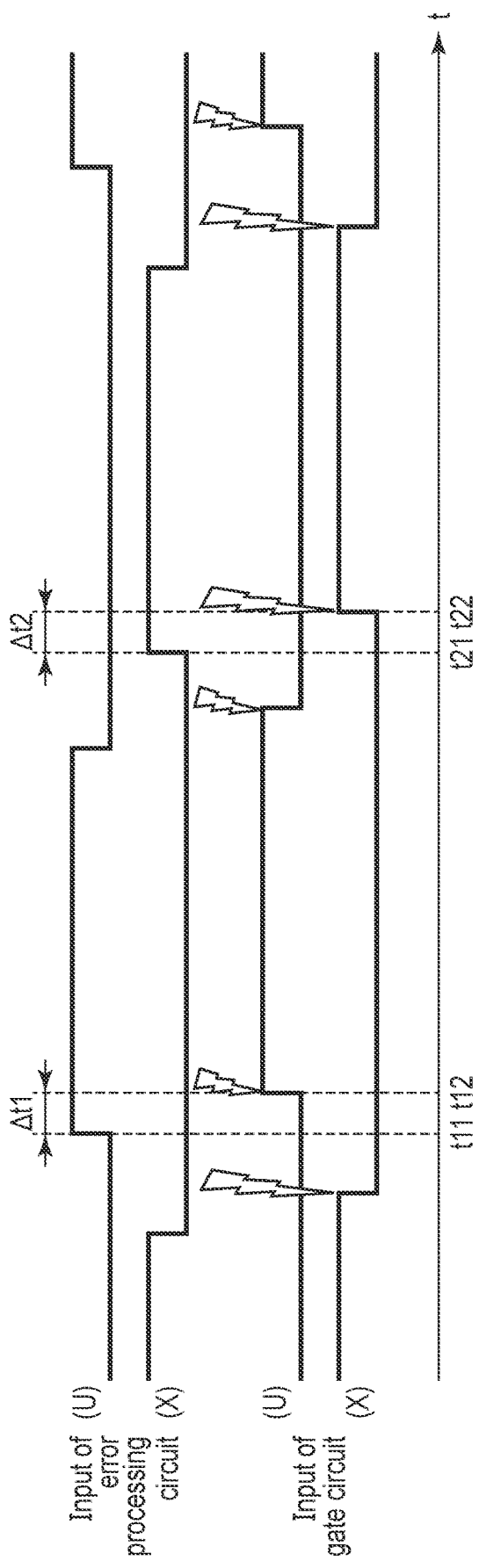
FIG. 17 illustrates an example of implementation of the control apparatus of the embodiment.

FIG. 17 illustrates an example of a temporal relationship between the gate signal input to the error processing circuit 32 (input of error processing circuit 32) and the gate signal input to the gate circuit 4 (input of gate circuit 4) in the structure in which upper and lower arms are controlled. In FIG. 17, the gate signal to control the upper arm is shown as gate signal (U) and the gate signal to control the lower arm as gate signal (X).

In the example of FIG. 17, the edge timing of the gate signal (U) input to the error processing circuit 32 is at timing t11, while the edge timing of the gate signal (U) input to the gate circuit 4 is at timing t12. In other words, it is understood that process delay Δt1 is set for the gate signal (U). The process delay Δt1 is greater than the sampling period, which is the smallest unit of the gate signal (U), and is equal to or less than the state duration time during which the upper arm remains in the on or off state, and is equal to or less than the dead time set for the upper arm.

Similarly, the edge timing of the gate signal (X) input to the error processing circuit 32 is at timing t21, while the edge timing of the gate signal (X) input to the gate circuit 4 is timing t22. In other words, it is understood that process delay Δt2 is set for the gate signal (X). The process delay Δt2 is greater than the sampling period, which is the smallest unit of the gate signal (X), and is equal to or less than the state duration time during which the lower arm remains in the on or off state, and is equal to or less than the dead time set for the lower arm.

In the structure in which the upper and lower arms are controlled as described above, it is possible to avoid a state close to a short circuit by considering the dead time and to improve the accuracy of the gate signals input to the relevant upper and lower arms (gate circuit).

In order to prevent the short circuit described above, it is preferable that the process delay Δt1 set for the gate signal (U) to control the upper arm and the process delay Δt2 set for the gate signal (X) to control the lower arm are the same value. However, if the delay is acceptable, the process delay Δt1 and the process delay Δt2 may be different values.

Although the description above has been given that the process delay is set by considering both the state duration time and the dead time, the process delay may be set (determined) by considering only the smaller of the state duration time and the dead time. In cases where the state duration time and dead time are the same value, for example, the dead time may not be considered.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control apparatus configured to control a gate circuit, the control apparatus comprising:
   a gate signal generation circuit configured to generate a gate signal to switch a state of the gate circuit;
   a transmitter configured to transmit the generated gate signal;
   a receiver configured to receive the transmitted gate signal; and
   an error processing circuit configured to process an error in the received gate signal and to output the gate signal to the gate circuit,
   wherein:
   a process delay by the error processing circuit is greater than a sampling period of the gate signal switching the state of the gate circuit, and is equal to or less than a time to retain the state of the gate circuit, and
   a pulse width of the gate signal is larger than the time to retain the state of the gate circuit, and is a time equivalent to an integer multiple of the sampling period.

2. The control apparatus of claim 1, wherein the error processing circuit includes:
   a detection circuit configured to detect an edge timing by which the state of the gate circuit is switched based on the received gate signal; and
   a correction circuit configured to correct an error in the gate signal after a time corresponding to the process delay passes from the detected edge timing.

3. The control apparatus of claim 2, wherein the correction circuit is configured to correct the error in the gate signal using a value of the gate signal within a time from the detected edge timing to the time corresponding to the process delay.

4. The control apparatus of claim 1, wherein a first side including the gate signal generation circuit and the transmitter and a second side including the receiver and the error processing circuit are mounted on different substrates.

5. The control apparatus of claim 1, wherein transmission/reception of the gate signal between the transmitter and the receiver is performed in a period shorter than the sampling period.

6. The control apparatus of claim 1, wherein:
   the transmitter is configured to transmit the generated gate signal wirelessly, and
   the receiver is configured to receive the wirelessly transmitted gate signal.

7. A power supply apparatus comprising:
   the control apparatus of claim 1, and
   the gate circuit.

8. A power supply apparatus comprising:
   the control apparatus of claim 1; and
   a first gate circuit and a second gate circuit,
   wherein:
   the receiver includes a first receiver and a second receiver,
   the error processing circuit includes a first error processing circuit configured to process an error in a first gate signal received by the first receiver and to output the first gate signal to the first gate circuit, and a second error processing circuit configured to process an error in a second gate signal received by the second receiver and to output the second gate signal to a second error processing circuit, and
   the transmitter is configured to transmit the first gate signal and the second gate signal to the first receiver and the second receiver.

9. A power supply apparatus comprising:
   the control apparatus of claim 1; and
   first to Nth gate circuits, where N is a natural integer which is two or more,
   wherein:
   the receiver part includes first to Nth receiver parts, the error processing circuit includes first to Nth error processing circuits configured to process an error in first to Nth gate signals received by the first to Nth receivers and to output the first to Nth gate signals to the first to Nth gate circuits, the transmitter includes a first transmitter and a second transmitter, the first transmitter is configured to transmit the first to Mth gate signals to the first to Mth receivers, where M is a natural integer which is one or more and greater than N, and the second transmitter is configured to transmit the M+1th to Nth gate signals to M+1th to Nth receivers.

10. A power supply apparatus comprising:
the control apparatus of claim 1; and
a first circuit and a second circuit,
wherein:
the receiver includes a first receiver and a second receiver,
the error processing circuit includes a first error processing circuit configured to process an error in a first gate signal received by the first receiver and to output the first gate signal to the first gate circuit, and a second error processing circuit configured to process an error in a second gate signal received by the second receiver and to output the second gate signal to the second gate circuit,
the transmitter includes a first transmitter and a second transmitter,
the first transmitter is configured to transmit the first gate signal to the first receiver, and
the second transmitter is configured to transmit the second gate signal to the second receiver.

11. A processing apparatus comprising:
a receiver configured to receive a gate signal to switch a state of a gate circuit; and
an error processing circuit configured to process an error in the received gate signal and to output the gate signal to the gate circuit,
wherein:
a process delay by the error processing circuit is greater than a sampling period of the gate signal switching the state of the gate circuit, and is equal to or less than a time to retain the state of the gate circuit, and a pulse width of the gate signal is larger than the time to retain the state of the gate circuit, and is a time equivalent to an integer multiple of the sampling period.

12. A method executed by a control apparatus configured to control a gate circuit, the method comprising:
generating a gate signal to switch a state of the gate circuit;
transmitting the generated gate signal;
receiving the transmitted gate signal; and
processing an error in the received gate signal and outputting the gate signal to the gate circuit,
wherein:
a process delay based on processing the error in the gate signal is greater than a sampling period of the gate signal switching the state of the gate circuit, and is equal to or less than a time to retain the state of the gate circuit, and
a pulse width of the gate signal is larger than the time to retain the state of the gate circuit, and is a time equivalent to an integer multiple of the sampling period.

13. A method comprising:
receiving a gate signal to switch a state of a gate circuit; and
processing an error in the received gate signal and outputting the gate signal to the gate circuit,
wherein:
a process delay based on processing the error in the gate signal is greater than a sampling period of the gate signal switching the state of the gate circuit, and is equal to or less than a time to retain the state of the gate circuit, and
a pulse width of the gate signal is larger than the time to retain the state of the gate circuit, and is a time equivalent to an integer multiple of the sampling period.

14. The control apparatus of claim 1, wherein the sampling period is a minimum unit by which the state of the gate circuit can be switched according to the gate signal.

* * * * *